(12) United States Patent
Simmons et al.

(10) Patent No.: US 6,892,837 B2
(45) Date of Patent: May 17, 2005

(54) ELECTRIC DRIVE SYSTEM WITH DIFFERENTIAL STEERING

(75) Inventors: Gerald P. Simmons, Morton, IL (US); Michael E. Vanderham, East Peoria, IL (US)

(73) Assignee: Caterpillar Inc, Peoria, IL (US)

( * ) Notice: Subject to any disclaimer, the term of this patent is extended or adjusted under 35 U.S.C. 154(b) by 103 days.

(21) Appl. No.: 10/268,759

(22) Filed: Oct. 11, 2002

(65) Prior Publication Data

US 2004/0069542 A1 Apr. 15, 2004

(51) Int. Cl.$^7$ .............................................. B62D 11/00
(52) U.S. Cl. ...................... 180/6.44; 180/65.6; 475/207
(58) Field of Search ................. 180/6.2, 6.44, 180/65.6, 65.7, 9.44; 475/5, 6, 18, 28, 207

(56) References Cited

U.S. PATENT DOCUMENTS

| | | | |
|---|---|---|---|
| 1,991,094 A | | 2/1935 | Highley |
| 4,280,579 A | * | 7/1981 | Zaunberger et al. ....... 180/6.44 |
| 4,357,840 A | | 11/1982 | Winzeler |
| 4,430,908 A | | 2/1984 | Stockton |
| 4,998,591 A | | 3/1991 | Zaunberger |
| 5,168,946 A | * | 12/1992 | Dorgan ...................... 180/6.44 |
| 5,195,600 A | | 3/1993 | Dorgan |
| 5,509,491 A | * | 4/1996 | Hall, III .................... 180/9.44 |
| 5,620,387 A | | 4/1997 | Janiszewski |
| 5,722,501 A | * | 3/1998 | Finch et al. ................ 180/6.44 |
| 5,851,162 A | | 12/1998 | Tether |
| 5,919,109 A | | 7/1999 | Fleckenstein |
| 6,024,182 A | | 2/2000 | Hamada et al. |
| 6,125,953 A | | 10/2000 | Arai et al. |
| 6,454,031 B2 | * | 9/2002 | Szymkowiak ............... 180/6.2 |
| 6,478,706 B1 | * | 11/2002 | Crabb .......................... 475/18 |

\* cited by examiner

*Primary Examiner*—Lesley D. Morris
*Assistant Examiner*—Daniel Yeagley
(74) *Attorney, Agent, or Firm*—Finnegan, Henderson, Farabow, Garrett & Dunner

(57) ABSTRACT

An electric drive system is provided. The electric drive system includes a first output member, a second output member, and an electric motor that includes an output shaft having an axis of rotation. The output shaft is operatively engaged with the first and second output members to rotate the first and second output members. A differential steering system is disposed between the electric motor and the first and second output members. The differential steering system includes at least one planetary gear assembly that has an axis of rotation that substantially aligns with the axis of rotation of the output shaft. A steering motor is operatively engaged with the at least one planetary gear assembly and is operable to modify the rotational speed of the at least one planetary gear assembly to thereby adjust the rotational speed of one of the first and second output members relative to the other of the first and second output members.

26 Claims, 2 Drawing Sheets

ELECTRIC DRIVE SYSTEM WITH DIFFERENTIAL STEERING

TECHNICAL FIELD

The present invention is directed to an electric drive system and, more particularly, to an electric drive system with differential steering.

BACKGROUND

An electric drive may be used as source of driving power in a vehicle, such as, for example, an off-road work machine, a highway truck, or an automobile. An electric drive may supplement the driving power provided by an internal combustion engine or the electric drive may provide all of the driving power for the vehicle. Using an electric drive to supplement or replace the internal combustion engine may reduce the emissions generated during the operation of the vehicle. In addition, the electric drive may increase the fuel efficiency of the vehicle.

An electric drive typically includes a source of electrical power and an electric motor that is connected to one or more ground engaging devices on the vehicle. The source of electrical power, which may be, for example, a battery or an engine, provides the power that is used to operate the electric motor to generate an output torque. The output torque is transferred to the ground engaging devices on the vehicle to thereby propel the vehicle.

Some vehicles, such as tracked work machines, may include a differential steering system that is disposed between the electric motor and the ground engaging devices on the vehicle. A differential steering system may include one or more planetary gear assemblies and a steering motor. The differential steering system is operable to change the relative speeds of the ground engaging devices to thereby change the direction of travel of the vehicle. When a ground engaging device on one side of the vehicle is driven at a slower speed than a ground engaging device on the other side of the vehicle, the vehicle will tend to turn towards the slower moving ground engaging device.

In a typical electric drive, such as the electric drive described in U.S. Pat. No. 6,024,182 to Hamada et al., the output torque of an electric motor is transferred from the electric motor to a differential system through a gear transfer system that may include, for example, a bevel or spur gear arrangement. However, the use of a bevel or spur gear arrangement is an inefficient method of transferring the torque of the motor to the ground engaging devices. Some of the torque generated by the electric motor may be lost in the torque transfer. These gear losses decrease the efficiency of the electric drive and the overall efficiency of the vehicle.

The electric drive system of the present invention solves one or more of the problems set forth above.

SUMMARY OF THE INVENTION

One aspect of the present invention is directed to an electric drive system that includes a first output member, a second output member, and an electric motor that includes an output shaft having an axis of rotation. The output shaft is operatively engaged with the first and second output members to rotate the first and second output members. A differential steering system is disposed between the electric motor and the first and second output members. The differential steering system includes at least one planetary gear assembly that has an axis of rotation that substantially aligns with the axis of rotation of the output shaft. A steering motor is operatively engaged with the at least one planetary gear assembly and is operable to modify the rotational speed of the at least one planetary gear assembly to thereby adjust the rotational speed of one of the first and second output members relative to the other of the first and second output members.

In another aspect, the present invention is directed to a method of assembling an electric drive system. An electric motor including an output shaft having an axis of rotation is provided. The electric motor is operable to rotate a first output member and a second output member. A differential steering system having at least one planetary gear assembly is disposed between the electric motor and the first and second output members such that an axis of rotation of the planetary gear assembly substantially aligns with the axis of rotation of the output shaft. A steering motor is engaged with the differential steering system. The steering motor is operable to modify the rotational speed of the at least one planetary gear assembly to thereby adjust the rotational speed of one of the first and second output members relative to the other of the first and second output members.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate an exemplary embodiment of the invention and together with the description, serve to explain the principles of the invention. In the drawings.

DETAILED DESCRIPTION

Reference will now be made in detail to an exemplary embodiment of the present invention, which is illustrated in the accompanying drawings. Wherever possible, the same reference numbers will be used throughout the drawings to refer to the same or like parts.

Figure 1:
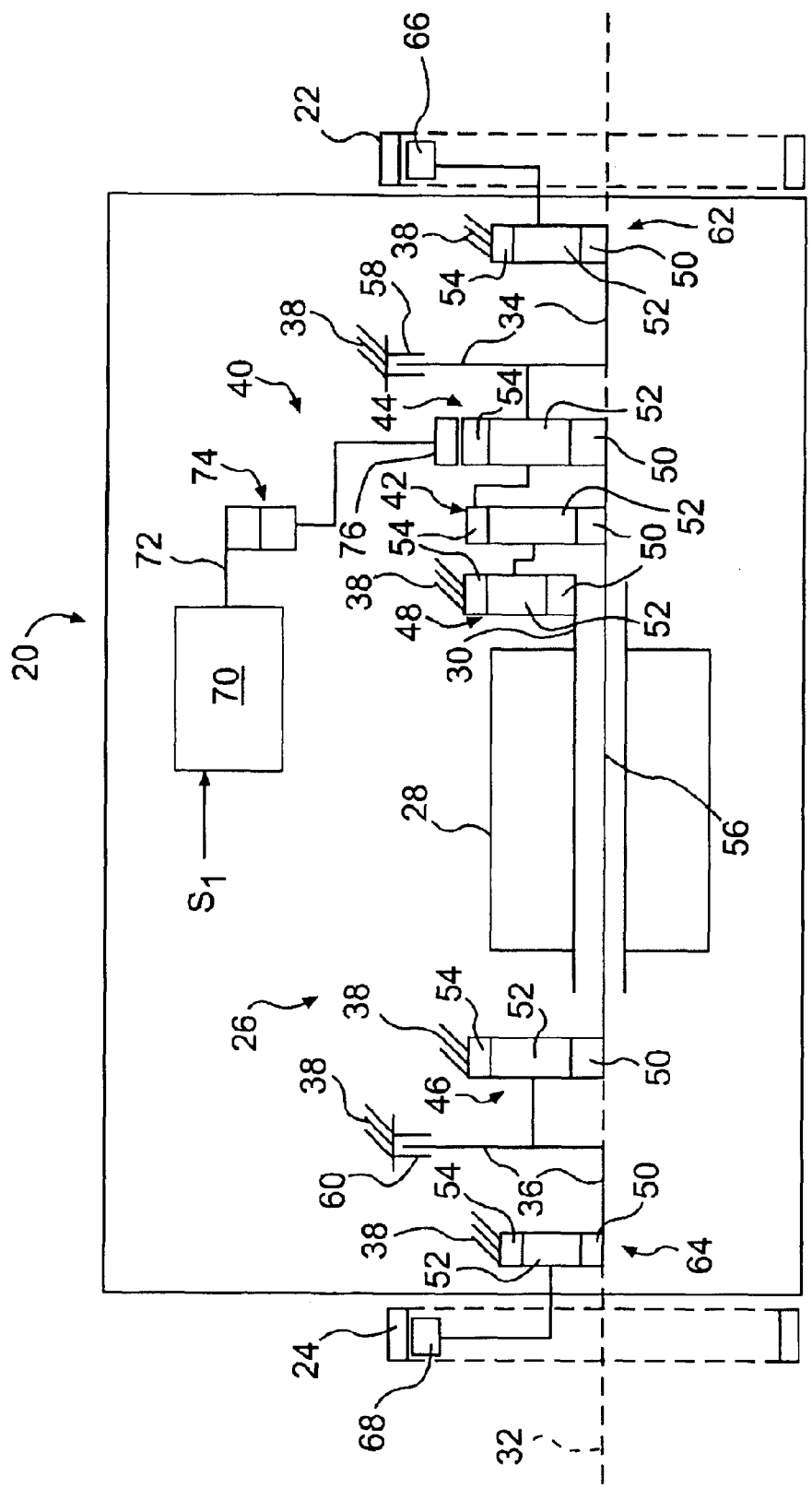
FIG. 1 is a schematic and diagrammatic representation of an electric drive system in accordance with an exemplary embodiment of the present invention.

As schematically and diagrammatically illustrated in FIG. 1, a vehicle 20 may include an electric drive system 26. Electric drive system 26 may be operatively engaged with a first ground engaging device 22 and a second ground engaging device 24. First and second ground engaging devices 22 and 24 may be, for example, tracks, belts, wheels, or any other ground engaging device readily apparent to one skilled in the art.

As also shown in FIG. 1, electric drive system 26 includes a housing 38, and an electric motor 28 that has an output shaft 30. Vehicle 20 may include an electrical power source (not shown) that may be, for example, a battery or an engine, such as an internal combustion engine, with a generator. In response to an application of electrical power, electric motor 28 exerts a torque on output shaft 30. The magnitude and direction of the exerted torque depends upon the magnitude and polarity of the electrical power that is applied to electric motor 28.

Figure 2:
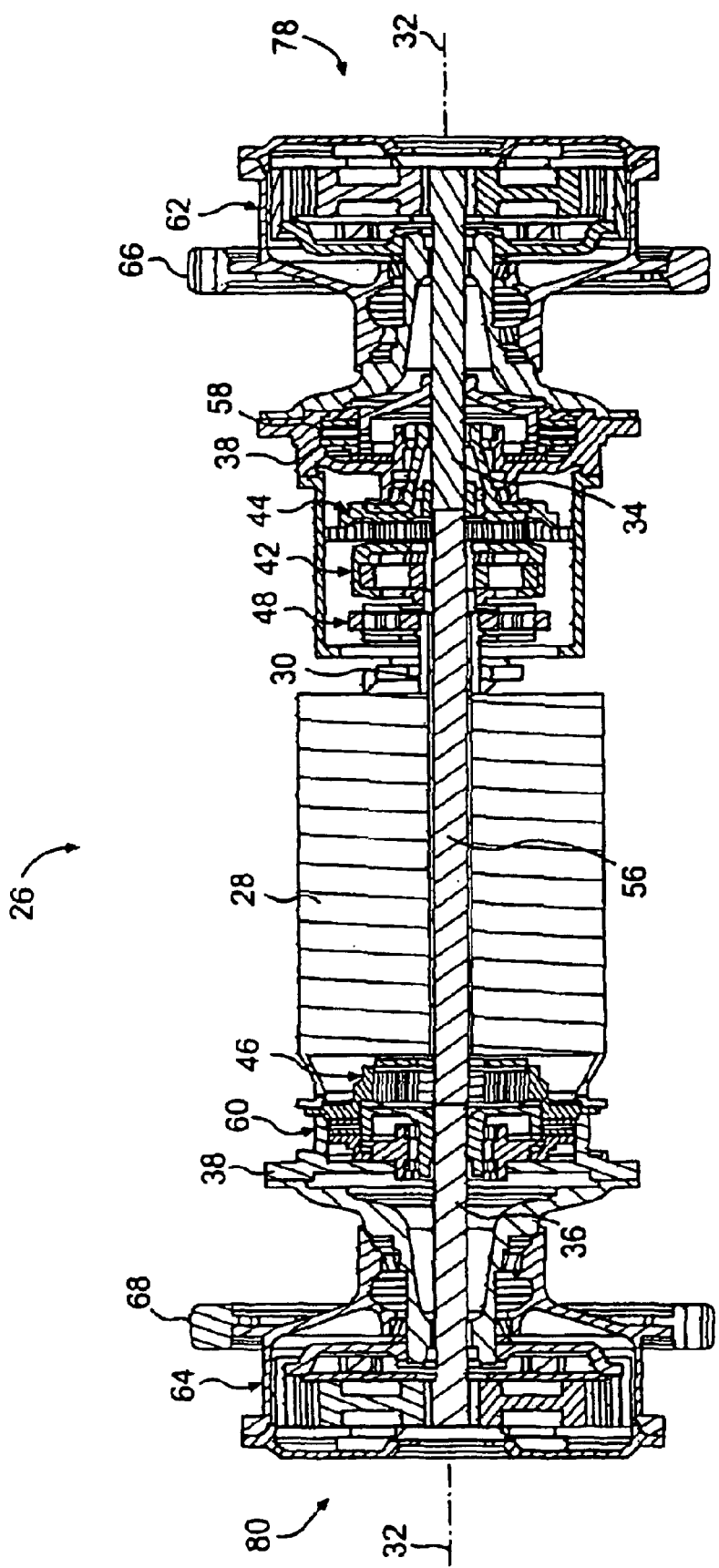
FIG. 2 is a sectional view of an electric drive system in accordance with an exemplary embodiment of the present invention.

In response to the exerted torque, output shaft 30 may begin to rotate. As shown in FIGS. 1 and 2, output shaft 30 of electric motor 28 is configured to rotate about an axis of rotation that aligns with a reference axis 32. The speed at which output shaft 30 rotates depends upon several factors, including, for example, the magnitude of the torque exerted by electric motor 28 and the load on output shaft 30.

Referring to FIG. 1, electric drive system 26 also includes a differential steering system 40, a first output member 34, and a second output member 36. First output member 34 is operatively connected to first ground engaging device 22. Second output member 36 is operatively connected to second ground engaging device 24.

In the illustrated embodiment, electric drive 26 may include a first sprocket 66 and a second sprocket 68. First sprocket 66 may be connected to first output member 34 and configured to engage first ground engaging device 22. Second sprocket 68 may be connected to second output member 36 and configured to engage second ground engaging device 24. First and second sprockets 66 and 68 drive first and second ground engaging devices 22 and 24 in response to rotation of first and second output members 34 and 36.

In the exemplary embodiment illustrated in FIGS. 1 and 2, differential steering system 40 includes a first planetary gear assembly 42, a second planetary gear assembly 44, and a third planetary gear assembly 46. One skilled in the art will recognize that differential steering system 40 may have a variety of different configurations and may include a greater or lesser number of planetary gear assemblies.

Each of the first, second, and third planetary gear assemblies 42, 44, and 46 includes a sun gear 50, a planet gear set 52, and a ring gear 54. Each sun gear 50 is configured to rotate about an axis and to mesh with the respective planet gear set 52. Planet gear set 52 orbits about sun gear 50 and meshes with the respective ring gear 54. Each ring gear 54 may be configured to rotate about the axis of rotation of sun gear 50 or each ring gear 54 may be fixed relative to housing 38 to prevent ring gear 54 from rotating.

As shown in FIGS. 1 and 2, the rotational axis of each of first, second, and third planetary gear assemblies 42, 44, and 46 substantially aligns with the reference axis 32. In addition, the rotational axis of each sun gear 50 and each planet gear set 52 of each of first, second, and third planetary gear assemblies 42, 44, and 46 substantially aligns with the reference axis 32. Thus, the rotational axis of each of first, second, and third planetary gear assemblies 42, 44, and 46 substantially aligns with the rotational axis of output shaft 30 of electric motor 28.

A fourth planetary gear assembly 48 may be positioned between output shaft 30 and first planetary gear assembly 42. Fourth planetary gear assembly 48 also includes a sun gear 50, a planet gear set 52, and a ring gear 54. Sun gear 50 meshes planet gear set 52, and planet gear set 52 meshes with ring gear 54. The rotational axis of fourth planetary gear assembly 48 may also substantially align with reference axis 32.

As one skilled in the art will recognize, a planetary gear assembly receives an input rotation at a first speed and generates a corresponding output rotation at a second speed. The change in rotational speed between the input and the output depends upon the number of teeth in sun gear 50, planet gear set 52, and ring gear 54. The change in rotational speed also depends upon the gears that are used to receive the input rotation and the gear that is selected to provide the output rotation.

The input rotation may be delivered to a planetary gear assembly through one or two of sun gear 50, planet gear set 52, and ring gear 54. If only one of sun gear 50, planet gear set 52, and ring gear 54 receives the input rotation then one of sun gear 50, planet gear set 52, and ring gear 54 may be fixed to housing 38. The output rotation will be generated in the remaining one of sun gear 50, planet gear set 52, and ring gear 54.

In the illustrated embodiment, fourth planetary gear assembly 48 is configured to reduce the rotational speed of output shaft 30 of electric motor 28. The output of fourth planetary gear assembly 48 is used as an input to differential steering system 40. In this manner, the torque generated by electric motor 28 may be transferred to differential steering system 40 at a reduced rotational speed.

As shown, output shaft 30 of electric motor 28 is connected to sun gear 50 of fourth planetary gear assembly 48. Ring gear 54 of fourth planetary gear assembly 48 is fixed to a housing 38. Planet gear set 52 of fourth planetary gear assembly 48 is connected to planet gear set 52 of first planetary gear assembly 42.

A rotation of output shaft 30 causes a corresponding rotation of sun gear 50. The rotation of sun gear 50 causes planet gear set 52 to orbit about sun gear 50 at a reduced rotational speed. The amount of reduction in the rotational speed depends upon the number of teeth in sun gear, planet gear set 52, and ring gear 54 of fourth planetary gear assembly 48. The reduced rotational speed of planet gear set 52 of fourth planetary gear assembly is transferred to differential steering system 40 as an input rotation to planet gear set 52 of first planetary gear assembly 42.

As shown in FIG. 1, first planetary gear assembly 42 is connected to both second planetary gear assembly 44 and third planetary gear assembly 46. Ring gear 54 of first planetary gear assembly 42 is connected to planet gear set 52 of second planetary gear assembly 44. A reaction member 56 connects sun gear 50 of first planetary gear assembly 42 to sun gears 50 of both second and third planetary gear assemblies 44 and 46. As shown, output shaft 30 of electric motor 28 may be hollow and include an opening through which reaction member 56 extends. In this manner, the rotational axis of reaction member 56 may also substantially align with reference axis 32.

First planetary gear assembly 42 provides an input rotation to both second planetary gear assembly 44 and third planetary gear assembly 46. A rotation of planet gear set 52 of first planetary gear assembly 42 causes a corresponding rotation of the associated sun gear 50 and of reaction member 56. The rotation of reaction member 56 provides an input rotation to sun gears 50 of both second and third planetary gear assemblies 44 and 46.

The rotation of sun gears 50 of second and third planetary gear assemblies 44 and 46 causes planet gear sets 52 to orbit about sun gears 50. In the illustrated embodiment, first, second, and third planetary gear assemblies 42, 44, and 46 are configured so that when ring gears 54 of second and third planetary gear assembly 44 and 46 are held stationary, planet gear sets 52 will orbit about sun gears 50 at the same rotational speed. One skilled in the art will recognize that planetary gear assemblies 42, 44, and 46 may have a variety of gear reduction ratios, depending upon the expected operating conditions of vehicle 20.

The rotational speed of planet gear sets 52 of second and third planetary gear assemblies 44 and 46 provides the output rotation of second and third planetary gear assemblies 44 and 46. The rotational speed of planet gear set 52 of second planetary gear assembly 44 is transferred to first output member 34 to thereby drive first ground engaging device 22 at a corresponding speed. The rotational speed of planet gear set 52 of third planetary gear assembly 46 is transferred to second output member 36 to thereby drive second ground engaging device 24 at a corresponding speed.

The rotational speed of planet gear sets 52 of second and third planetary gear assemblies 44 and 46 may be altered by providing an additional input to one or both of the ring gears 54 in second and third planetary gear assemblies 44 and 46. In the illustrated embodiment, ring gear 54 of second planetary gear assembly 44 is configured to rotate about reference axis 32, whereas ring gear 54 of third planetary gear assembly 46 is fixed to housing 38. Alternatively, ring gear 54 of third planetary gear assembly 46 may be configured to rotate about reference axis 32 and ring gear 54 of second planetary gear assembly 44 may be fixed to housing 38 or both ring gears 54 may be configured to rotate about reference axis 32.

As illustrated in FIG. 1, vehicle 20 may also include a steering motor 70 that provides an additional input to differential steering system 40. Steering motor 70 is operable to rotate an output shaft 72. Steering motor 70 may be, for example, an electrical motor or a hydraulic motor.

In the illustrated embodiment, output shaft 72 is connected to ring gear 54 of second planetary gear assembly 44 through a set of transfer gears 74 and an engagement gear 76. Rotation of output shaft 72 in a first direction will cause ring gear 54 of second planetary gear assembly 44 to rotate in a first direction. Rotation of output shaft 72 in a second direction will cause ring gear 54 of second planetary gear assembly 44 to rotate in the opposite direction.

The operation of steering motor 70 may be governed by an input signal $S_1$. The input signal $S_1$ may be generated by a control (not shown) in response to an instruction from an operator to turn the vehicle in a certain direction at a certain turning radius. The control may control steering motor 70 to generate a desired direction and speed of rotation in output shaft 30.

As also illustrated in FIG. 1, a first brake 58 may be configured to engage first output member 34 and a second brake 60 may be configured to engage second output member 36. First and second brakes 58 and 60 may be operated to reduce the rotational speed of first and second output members 34 and 36, respectively. First and second brakes 58 and 60 may therefore be operated to reduce the speed of vehicle 20. In addition, first and second brakes 58 and 60 may be engaged with first and second output members 34 and 36, respectively, when vehicle 20 is stationary to thereby prevent vehicle 20 from moving.

As further shown in FIG. 1, a first final drive assembly 62 may be disposed between first output member 34 and first sprocket 66 and a second final drive assembly 64 may be disposed between second output member 36 and second sprocket 68. Each final drive assembly 62 and 64 may be a planetary gear assembly that includes a sun gear 50, a planet gear set 52, and a ring gear 54. The rotational axis of each final drive assembly 62 and 64 may substantially align with reference axis 32.

Each final drive assembly 62 and 64 may provide a gear reduction between the first and second output members 34 and 36 and first and second sprockets 66 and 68. For example, the gear reduction of first and second final drives 62 and 64 may be 5:1. One skilled in the art will recognize that final drives 62 and 64 may provide any gear reduction to meet the operational requirements of vehicle 20.

FIG. 2 illustrates an exemplary configuration of electric drive 26. As shown, first, second, and fourth planetary gear assemblies 42, 44, and 48 may be installed in housing 38 from a first side 78. First brake 58, first final drive 62, and first sprocket 66 may also be installed on first side 78. Electric motor 28 and third planetary gear assembly 46 may be installed from a second side 80 of housing 38. Second brake 60, second final drive 62, and second sprocket 68 may also be installed from second side. 80. Steering motor 70, transfer gear 74, and engagement gear 76 (referring to FIG. 1) may then be connected to housing 38 to engage differential steering system 40. One skilled in the art will recognize that these installation steps may be performed in any order that may facilitate assembly of electric drive 26.

Industrial Applicability

An electric drive 26 according to the present disclosure may be included in a vehicle 20 to propel the vehicle 20. Vehicle 20 may be, for example, a work machine, such as a track layer. One skilled in the art will recognize that electric drive 26 may be included in other types of vehicles, such as, for example, other work machines, on or off highway trucks, or automobiles.

Vehicle 20 may include an internal combustion engine or an electrical storage device that supplies electrical power to electric drive 26. A control may govern the generation and/or supply of electrical power to electric drive 26 in response to instructions from an operator. For example, the supply of electrical power to electric drive 26 may be increased when the operator provides an instruction to increase the speed of vehicle 20.

In response to the application of electric power to electric drive 26, electric motor 28 exerts a torque on output shaft 30. The magnitude and polarity of the electrical power applied to the electric motor 28 determines the direction and magnitude of the torque exerted on output shaft 30. The torque exerted by electric motor 28 causes output shaft 30 to rotate.

The rotational speed of output shaft 30 is reduced by fourth planetary gear assembly 48 to an output rotation of planet gear set 52. The rotation of planet gear set 52 of fourth planetary gear assembly 48 is directed as an input to first planet gear set 52 of first planetary gear assembly 42 in differential steering system 40. The rotational speed of planet gear set 52 of first planetary gear assembly 42 causes a corresponding rotation of sun gear 50 of first planetary gear assembly 42 and of reaction member 56.

The rotation of reaction member 56 drives sun gears 50 of second and third planetary gear assemblies 44 and 46. The rotation of sun gears 50 of second and third planetary gear assemblies 44 and 46 causes planet gear sets 52 of both second and third planetary gear assemblies 44 and 46 to rotate. The rotation of planet gear set 52 of second planetary gear assembly 44 is transferred through first final drive 62 and first sprocket 66 to thereby drive first ground engaging device 22. The rotation of planet gear set 52 of third planetary gear assembly 46 is transferred through second final drive 64 and second sprocket 68 through to thereby drive second ground engaging device 24.

When the operator instructs the vehicle to travel in a straight line, steering motor 70 is held stationary. Steering motor 70 exerts a resistive torque against ring gear 54 of second planetary gear assembly 44 to thereby prevent ring gear 54 from rotating. Accordingly, planet gear sets 52 of both second and third planetary gear assemblies 44 and 46 will rotate at substantially the same speed. This results in the first and second ground engaging devices 22 and 24 being driven at substantially the same speed. Thus, when ring gear 54 of second planetary gear assembly 44 is stationary, vehicle 20 will travel in substantially a straight line.

When the operator instructs the vehicle to turn in a certain direction, steering motor 70 is operated to provide an additional input into differential steering system 40. Steering motor 70 may cause ring gear 54 of second planetary gear assembly 44 to rotate in a first direction at a certain speed to cause vehicle 20 to turn in a first direction at a certain turning radius. Steering motor 70 may also cause ring gear 54 of second planetary gear assembly 44 to rotate in a second direction at a certain speed to cause vehicle 20 to turn in a second direction at a certain turning radius.

Rotating ring gear 54 of second planetary gear assembly 44 in a first direction may decrease the rotational speed of planet gear set 52 of second planetary gear assembly 44 relative to the rotational speed of planet gear set 52 of third planetary gear assembly 46. This change in the relative speeds causes first output member 34 to rotate slower than second output member 36. Thus, first ground engaging device 22 will be driven at a slower speed than second ground engaging device 24. This will cause vehicle 20 to turn in the direction of first ground engaging device 22.

Rotating ring gear 54 of second planetary gear assembly 44 in a second direction may increase the rotational speed of planet gear set 52 of second planetary gear assembly 44 relative to the rotational speed of planet gear set 52 of third planetary gear assembly 46. This change in relative speed causes first output member 34 to rotate faster than second output member 36. Thus, first ground engaging device 22 will be driven at a faster speed than second ground engaging device 24. This will cause vehicle 20 to turn in the direction of second ground engaging device 24.

The turning rate of vehicle 20 is determined by the magnitude of the difference in relative speeds of first and second ground engaging devices 22 and 24. Increasing the rotational speed of ring gear 54 of second planetary gear assembly 44 will increase the magnitude of the difference in rotational speed between first and second output members 34 and 36. Thus, an increase in the rotational speed of output shaft 72 of steering motor 70 will cause an increase in the turning rate of vehicle 20. Conversely, a decrease in the rotational speed of output shaft 72 of steering motor 70 will cause a decrease in the turning rate of vehicle 20.

As will be apparent from the foregoing description, the present invention provides an electric drive 26 in which the rotational axis of an electric motor 28 substantially aligns with the rotational axis of a planetary differential system 40. By aligning the rotational axes in this fashion, the output torque of electric motor 28 may be delivered directly to differential steering system 40 without the need for a bevel or spur gear transfer arrangement. This results in a reduction in gear losses associated with transferring torque from the electric motor 28 to a ground engaging device. Thus, the described electric drive 26 will increase the efficiency of electric drive 26 and vehicle 20.

In addition, by configuring the electric drive 26 as described herein, the overall size of the electric drive 26 may be reduced. The reduction in size of the electric drive may free additional space in the vehicle. The additional space may be used to house other components or systems in vehicle 20.

It will be apparent to those skilled in the art that various modifications and variations can be made in the electric drive system of the present invention without departing from the scope of the invention. Other embodiments of the invention will be apparent to those skilled in the art from consideration of the specification and practice of the invention disclosed herein. It is intended that the specification and examples be considered as exemplary only, with a true scope of the invention being indicated by the following claims and their equivalents.

What is claimed is:

1. An electric drive system; comprising:
   a first output member;
   a second output member;
   an electric motor including an output shaft having an axis of rotation, the output shaft operatively engaged with the first and second output members to rotate the first and second output members;
   a differential steering system disposed between the electric motor and the first and second output members, the differential steering system including a first planetary gear assembly, a second planetary gear assembly, and a third planetary gear assembly, each of the first, second, and third planetary gear assemblies having a sun gear, a planet gear set, a ring gear, and a rotational axis that substantially aligns with the rotational axis of the output shaft;
   a steering motor operatively engaged with the at least one of the first, second and third planetary gear assemblies and operable to modify the rotational speed of the at least one planetary gear assembly to thereby adjust the rotational speed of one of the first and second output members relative to the other of the first and second output members; and
   a reaction member directly connecting the sun gears of the first, second, and third planetary gear assemblies.

2. The electric drive system of claim 1, wherein the output shaft of the electric motor is hollow and the reaction member extends therethrough.

3. The electric drive system of claim 1, wherein the output shaft of the electric motor is connected to the planet gear set of the first planetary gear assembly.

4. The electric drive system of claim 1, wherein the steering motor operatively engages the ring gear of the second planetary gear assembly.

5. The electric drive system of claim 1, wherein the first output member is connected to the planet gear set of the second planetary gear assembly.

6. The electric drive system of claim 1, wherein the second output member is connected to the planet gear set of the third planetary gear assembly.

7. The electric drive system of claim 6, further including a housing and wherein the ring gear of the third planetary gear assembly is fixed to the housing.

8. The electric drive system of claim 1, wherein the first and second planetary gear assemblies are disposed between the electric motor and the first output member, and the third planetary gear assembly is disposed between the electric motor and the second output member.

9. The electric drive system of claim 1, wherein the ring gear of the first planetary gear assembly is connected to the planet gear set of the second planetary gear assembly.

10. The electric drive system of claim 1, further including a fourth planetary gear assembly disposed between the electric motor and the differential steering system, the fourth planetary gear assembly being configured to reduce the rotational speed of the output shaft.

11. The electric drive system of claim 1, wherein the steering motor is configured to selectively rotate at least one ring gear of the first, second, and third planetary gear assemblies of the differential steering system to increase the speed of the first output member relative to the second output member when a speed of the steering motor is increased, and configured to selectively rotate the at least one ring gear of the first, second, and third planetary gear assemblies of the differential steering system to decrease the speed of the first output member relative to the second output member when the speed of the steering motor is decreased.

12. A method of assembling an electric drive system, comprising:
providing an electric motor including an output shaft having an axis of rotation, the electric motor operable to rotate a first output member and a second output member;
disposing a differential steering system having a first planetary gear assembly, a second planetary gear assembly, and a third planetary gear assembly, between the electric motor and the first and second output members such that an axis of rotation of the first, second, and third planetary gear assemblies substantially aligns with the axis of rotation of the output shaft;
engaging a steering motor with the differential steering system, the steering motor operable to modify the rotational speed of at least one of the first, second, and third planetary gear assemblies to thereby adjust the rotational speed of one of the first and second output members relative to the other of the first and second output members; and
directly connecting sun gears of the first, second and third planetary gear assemblies with a reaction member.

13. The method of claim 12, further including disposing a first brake adjacent the first output member and a second brake adjacent the second output member.

14. The method of claim 13, further including engaging a first sprocket with the first output member and a second sprocket with the second output member.

15. The method of claim 14, further including providing a housing having a first side configured to receive the first and second planetary gear assemblies, the first output member, the first brake, a first final drive, and the first sprocket, the housing having a second side configured to receive the third planetary gear assembly, the second brake, and a second final drive.

16. A vehicle, comprising:
a first ground engaging device;
a second ground engaging device;
a first output member connected to the first ground engaging device;
a second output member connected to the second ground engaging device;
an electric motor including an output shaft having an axis of rotation, the output shaft operatively engaged with the first and second output members to rotate the first and second output members;
a differential steering system disposed between the electric motor and the first and second output members, the differential steering system including a first planetary gear assembly, a second planetary gear assembly, and a third planetary gear assembly, each of the first, second, and third planetary gear assemblies having a sun gear, a planet gear set, a ring gear, and a rotational axis that substantially aligns with the rotational axis of the output shaft;
a differential steering motor operatively engaged with at least one planetary gear assembly and operable to vary the rotation of at least one of the first, second, and third planetary gear assemblies to thereby adjust the rotational speed of one of the first and second output members relative to the other of the first and second output members; and
a reaction member directly connecting the sun gears of the first, second, and third planetary gear assemblies.

17. The vehicle of claim 16, wherein the output shaft of the electric motor is hollow and the reaction member extends therethrough.

18. The vehicle of claim 16, wherein the output shaft of the electric motor is connected to the planet gear set of the first planetary gear assembly.

19. The vehicle of claim 16, wherein the differential steering motor operatively engages the ring gear of the second planetary gear assembly.

20. The vehicle of claim 16, wherein the first output member is connected to the planet gear set of the second planetary gear assembly.

21. The vehicle of claim 16, wherein the second output member is connected to the planet gear set of the third planetary gear assembly.

22. The vehicle of claim 16, further including a housing and wherein the ring gear of the third planetary gear assembly is fixed to the housing.

23. The vehicle of claim 16, wherein the first and second planetary gear assemblies are disposed between the electric motor and the first output member and the third planetary gear assembly is disposed between the electric motor and the second output member.

24. The vehicle of claim 16, wherein the ring gear of the first planetary gear assembly is connected to the planet gear set of the second planetary gear assembly.

25. The vehicle of claim 16, further including a fourth planetary gear assembly disposed between the electric motor and the differential steering system and configured to reduce the rotational speed of the output shaft.

26. The vehicle of claim 16, wherein the steering motor is configured to selectively rotate at least one ring gear of the first, second, and third planetary gear assemblies of the differential steering system to increase the speed of the first output member relative to the second output member when a speed of the steering motor is increased to turn the vehicle in a first direction, and configured to selectively rotate the at least one ring gear of the first, second, and third planetary gear assemblies in a second direction to decrease the speed of the first output member relative to the second output member when the speed of the steering motor is decreased to turn the vehicle in a second direction.

* * * * *